US010349779B1

(12) United States Patent
Garcia

(10) Patent No.: US 10,349,779 B1
(45) Date of Patent: Jul. 16, 2019

(54) CONTAINER FOR HOLDING LIQUID

(71) Applicant: Alanna R. Garcia, Austin, TX (US)

(72) Inventor: Alanna R. Garcia, Austin, TX (US)

(*) Notice: Subject to any disclaimer, the term of this patent is extended or adjusted under 35 U.S.C. 154(b) by 0 days.

(21) Appl. No.: 15/972,740

(22) Filed: May 7, 2018

(51) Int. Cl.
*A47G 19/22* (2006.01)
*A47J 41/00* (2006.01)
*B65D 1/04* (2006.01)
*B65D 81/32* (2006.01)
*A47G 19/12* (2006.01)
*B65D 81/38* (2006.01)

(52) U.S. Cl.
CPC ...... *A47J 41/0077* (2013.01); *A47G 19/2205* (2013.01); *B65D 1/04* (2013.01); *A47G 2019/122* (2013.01); *B65D 81/3216* (2013.01); *B65D 81/3869* (2013.01)

(58) Field of Classification Search
CPC ........ B65D 1/04; B65D 1/40; A47G 19/2205; A47G 19/22; A47J 41/0077
USPC ....................................... 220/62.12
See application file for complete search history.

(56) References Cited

U.S. PATENT DOCUMENTS

| 2,507,425 A | * | 5/1950 | Swartout | A47J 47/02 126/281 |
| 5,228,384 A | * | 7/1993 | Kolosowski | A47J 27/10 126/369 |
| 5,894,948 A | * | 4/1999 | Yeh | A47G 19/2227 215/12.1 |

* cited by examiner

*Primary Examiner* — King M Chu
(74) *Attorney, Agent, or Firm* — Sanchelima & Associates, P.A.; Christian Sanchelima; Jesus Sanchelima

(57) ABSTRACT

A container for holding liquid is disclosed. The container comprises a first tubular wall and a second tubular wall. Diameter of the first tubular wall is greater than the diameter of the second tubular wall. The container comprises a base provided at bottom of the first tubular body and the second tubular body to form a closed structure. The space formed between the inner surface of the first tubular wall and outer surface of the second tubular wall and the base, and spaced formed between the second tubular wall and the base is used to hold liquid separately.

7 Claims, 3 Drawing Sheets

CONTAINER FOR HOLDING LIQUID

OTHER RELATED APPLICATIONS

The present application does not claim priority from any other application.

FIELD OF THE INVENTION

The present disclosure generally relates to a container used for holding liquid. More specifically, the present disclosure generally relates a container comprising at least two chambers for holding liquid separately.

DESCRIPTION OF THE RELATED ART

It is known that containers are used to hold various types of liquids. For example, the containers are used to hold liquids such as a beverage either served hot or cold or at room temperature. The containers may be provided in various designs which includes but not limited to a beer glass, wine glass, tumbler and so on.

It must be noted that the containers that are known in art can hold only one type of liquid at a time. If a user wishes to use different type of liquids, then the user must use another container. In another instances, if the user wishes to refill the container, then the user must use liquid from another container.

There is no design disclosed in the prior art that discloses a container comprising two chambers for holding liquid that can be used to refill or to hold two different types of liquids separately in a single container. One design disclosed in the prior art comes close to having two separate chambers to hold the liquid. Specifically, United States granted patent 5894948 discloses a mug assembly comprising an internal mug adapted to be positioned inside an external mug. In U.S. Pat. No. 5,894,948, decorative indicia are provided between the inner surface of the external mug and the outer surface of the internal mug. It should be noted that the above design could be used to only for holding one liquid in the cylindrical chamber formed due to the internal mug and the base. If the user wishes to refill the liquid in the internal mug, the user must use another mug containing liquid.

Other examples disclosing the container having two-walls is disclosed in United States Patent Application numbered 20150216343 and a United States granted patent numbered 8561825. However, each of the above disclosures is concerned about providing an insulated wall around the surface of the container to protect the user from holding the container when it is hot or cold.

None of the disclosures discussed above discloses a container having at least two tubular bodies with a base forming two chambers that can hold two different liquids at the same time or that can be used to refill the liquid without need of using another container.

Other documents describing the closest subject matter provide a number of more or less complicated features that fail to solve the problem in an efficient and economical way. None of the patents suggest the novel features of the present invention.

Therefore, there is a need in the art for a container that has a unique design allowing it to hold two liquids at the same time.

SUMMARY OF THE INVENTION

It is one of the main objects of the present invention to provide a container comprising a first tubular body, a second tubular body and a base forming two chambers that avoids the drawbacks of the prior art.

It is one object of the present invention to provide a container comprising a first tubular body, a second tubular body and a base forming two chambers, which can hold one liquid in order to refill when needed or to hold two different types of liquid separately from one another.

It is another object to provide a container comprising a first tubular body, a second tubular body and a base forming two chambers, wherein each of the chambers comprises a controller provided at the bottom to dispense liquid stored in the respective chambers.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses a container comprising a first tubular body, a second tubular body, and a base. The first tubular body and the second tubular body are formed in a cylindrical structure with the base thereby forming a closed structure at one end and having two openings (first and second tubular body) at another end. The gap between the first tubular body, the second tubular body and the base form a first chamber. The second tubular body with the base at the bottom forms a second chamber. The first chamber and the second chamber are used to store or hold liquid of same kind or of different kinds.

The first tubular body and the second tubular body may be provided with a pipe at the bottom to dispense the liquid stored in the first tubular body and the second tubular body respectively.

Figure 1:
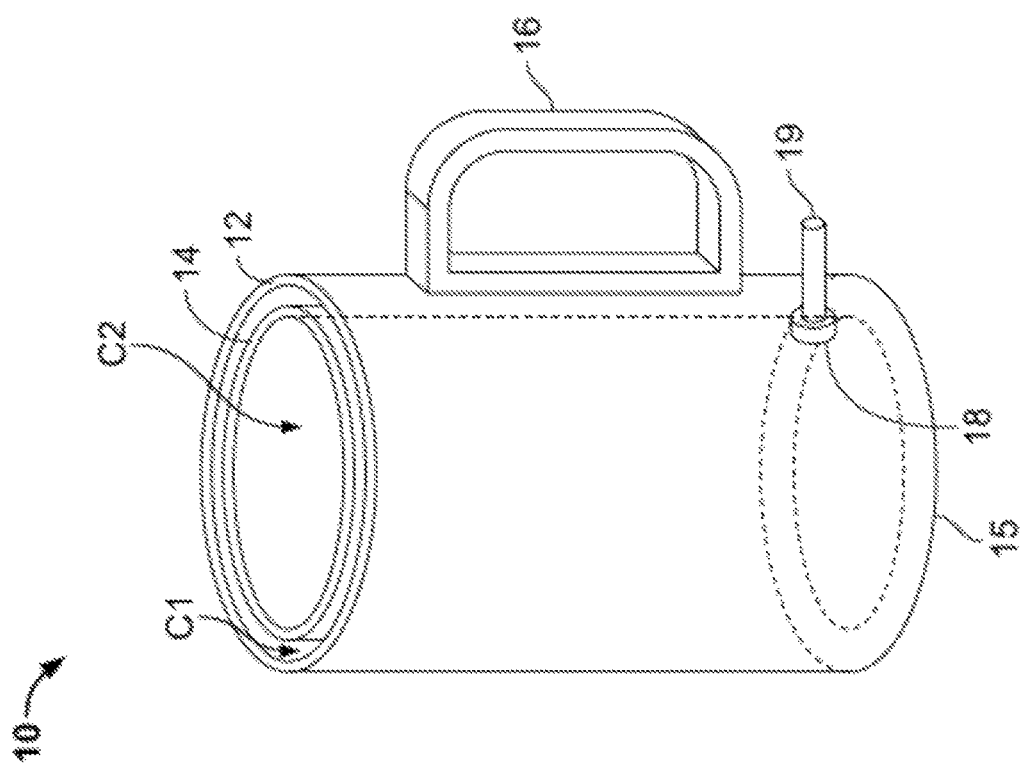
FIG. 1 illustrates a perspective view of a container comprising a first tubular body, a second tubular body, and a base forming two separate chambers, in accordance with one embodiment of the present disclosure.
Figure 2:
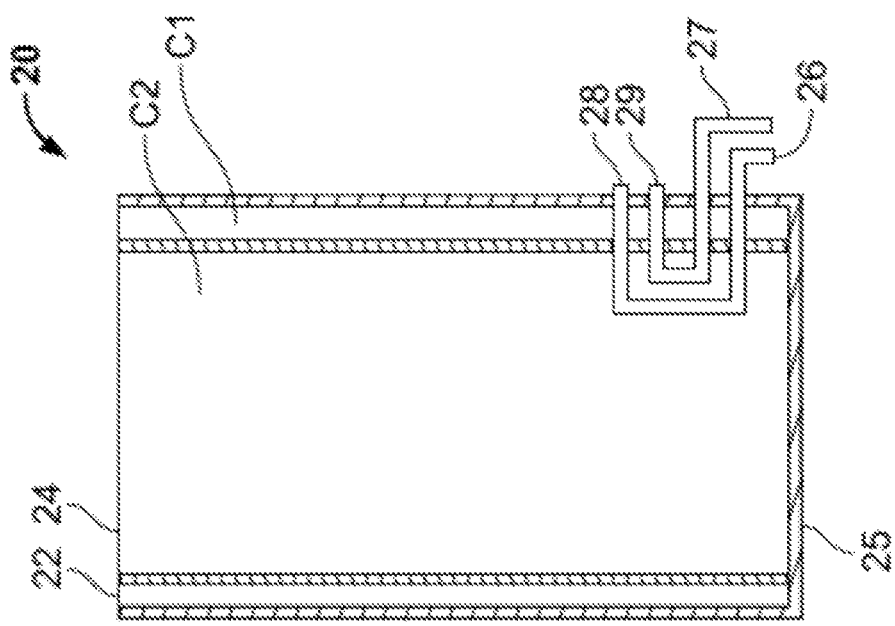
FIG. 2 illustrates a cross-sectional view of a container comprising pipes at the bottom to dispense liquid stored in the container, in accordance with one embodiment of the present disclosure.
Figure 3:
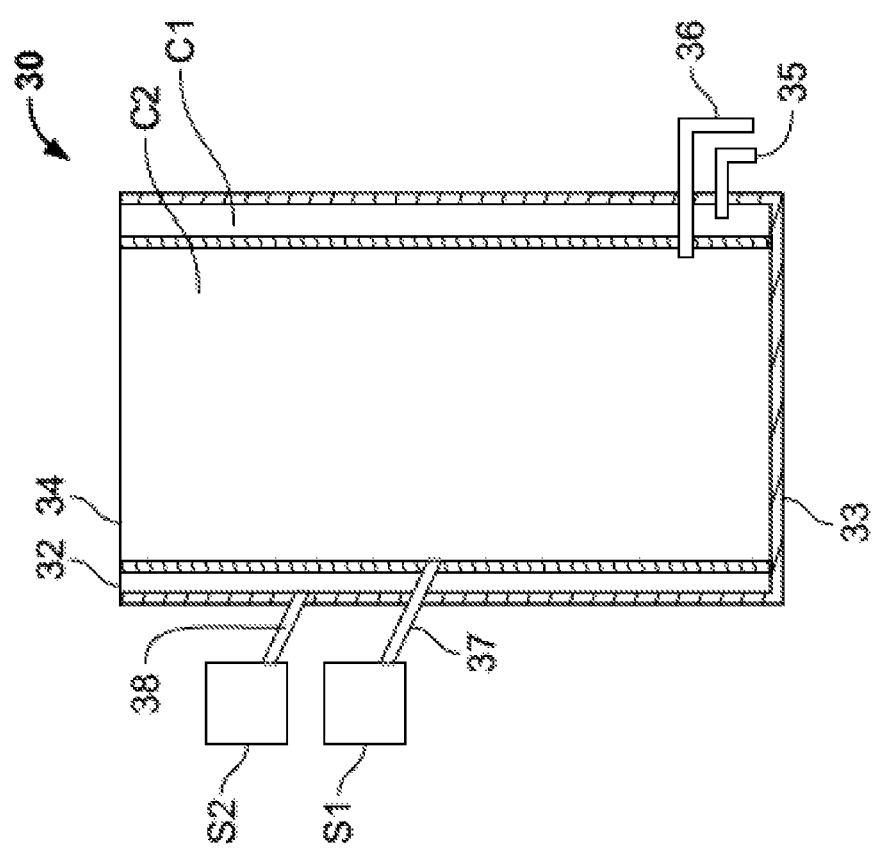
FIG. 3 illustrates a cross-sectional view of a container comprising storage tanks for storing liquid and pipes at the bottom to dispense liquid stored in the container, in accordance with one embodiment of the present disclosure.

Various features and embodiments of a container comprising a first tubular body, a second tubular body, and a base used for holding different liquids are explained in conjunction with the description of FIGS. 1-3.

Referring to FIG. 1, a container 10 for holding liquid is shown, in accordance with one implementation of the present disclosure. The container 10 comprises a first tubular body 12 and a second tubular body 14. In one example, the diameter of the first tubular body 12 is greater than the second tubular body 14. Further, the container 10 comprises a base 15 provided at bottom of the first tubular body 12 and the second tubular body 14 to form a closed structure at one end and having two openings (first and second tubular body) at another end. Each of the first tubular body 12, the second tubular body 14 and the base 15 may be made up of a suitable material such as a glass, ceramic, porcelain, plastic, stainless steel and so on.

It should be noted that space is created due to the gap between the inner surface of the first tubular body 12, outer surface of second tubular body 14 and the base 15. Further, an opening is created at the upper portion for filling and pouring a liquid such as a beverage. The space created between the inner surface of the first tubular body 12, outer surface of second tubular body 14 and the base 15 forms a first chamber C1. Further, additional space is created inside of the second tubular body 14 and the first tubular body 12 or base 15. Further, an opening is created at the upper portion or filling and pouring a beverage. The space created inside of the second tubular body 14 and the base 15 forms a second chamber C2.

In one implementation, each of the first chamber C1 and the second chamber C2 are used to store two same or different liquids. For example, the first chamber C1 may be used to store water. Further, the second chamber C2 may be used to store fruit juice. In order to fill liquid into the first chamber C1, a user may pour the liquid from the upper opening between the first tubular body 22, and the second tubular body 24. Further, the user may pour the liquid through the opening provided at upper portion of the second tubular body 14 to fill liquid into the second chamber C2. Although it is presented that the first chamber C1 and the second chamber C2 are used to store different type of liquids, it is obvious to a person skilled in the art to store same liquid e.g., fruit juice in the first chamber C1 and the second chamber C2.

In one implementation, the container 10 comprises a handle 16 to hold or to lift the container 10. The handle 16 may be made of a suitable material such as a glass, ceramic, porcelain, plastic, stainless steel and so on. The handle 16 may be used to lift the container 10 to consume or to dispense the liquid stored in the first chamber C1 or the second chamber C2.

In one example, the second tubular wall 14 may be provided with a hole 18 at the bottom. Further, the hole 18 is coupled to a connector 19 extending outward of the first tubular wall 12. It should be understood that the connector 19 might act like a push release mechanism that will allow releasing or stopping liquid flowing from one chamber to another. In one implementation, pressing the connector 19 may open the hole 18 such that the liquid stored in the first chamber C1 is made to flow into the second chamber C2. As such, when the liquid stored in the second chamber C2 gets over, the liquid from the first chamber C1 is made to flow in to the second chamber C2 thereby refilling the second chamber C2 without the need of other containers or external source. It should be understood that the hole 18 may be provided at appropriate height from the base 15 as may be needed and the position of the hole 18 shown in figure is provided for illustration purpose only.

Referring to FIG. 2, a cross-sectional view of a container 20 for holding liquid is shown, in accordance with one implementation of the present disclosure. The container 20 comprises a first tubular body 22 and a second tubular body 24. The diameter of the first tubular body 22 is greater than the second tubular body 24. Further, the container 20 comprises a base 25 provided at bottom of the first tubular body 22 and the second tubular body 24 to form a closed structure at one end. Each of the first tubular body 22, the second tubular body 24 and the base 25 may be made up of a suitable material such as a glass, ceramic, porcelain, plastic, stainless steel and so on.

It should be noted that space is created due to the gap between the inner surface of the first tubular body 22, outer surface of second tubular body 24 and the base 25. Further, an opening is created at the upper portion or filling and pouring a beverage. The space created between the inner surface of the first tubular body 22, outer surface of second tubular body 24 and the base 25 forms a first chamber C1. Further, additional space is created inside of the second tubular body 24 and the base 25. Further, an opening is created at the upper portion or filling and pouring a beverage. The space created inside of the second tubular body 24 and the base 25 forms a second chamber C2.

In one implementation, the first chamber C1 and the second chamber C2 are used to store two different liquids. In order to fill liquid into the first chamber C1, a user may pour the liquid from the upper opening between the of the first tubular body 22, and the second tubular body 24. Further, the user may pour the liquid through the opening provided at upper portion of the second tubular body 24 to fill liquid into the second chamber C2.

In the present embodiment, the container 20 may be provided with a first pipe 26 and a second pipe 27. The first pipe 26 extends from the inner surface of the first tubular wall 22 and coupled to a first actuator 28 provided at outer surface of the first tubular wall 22. Upon pressing the first actuator 28, the liquid stored in the first chamber C1 is made to flow out through the first pipe 26. Similarly, the second pipe 27 extends from the inner surface of the second tubular wall 24 and coupled to a second actuator 29 provided at outer surface of the first tubular wall 22. Upon pressing the second actuator 29, the liquid stored in the second chamber C2 is made to flow out through the second pipe 27.

Referring to FIG. 3, a cross-sectional view of a container 30 for holding liquid is shown, in accordance with one implementation of the present disclosure. The container 30 comprises a first tubular body 32, a base 33 and a second tubular body 23. The diameter of the first tubular body 32 is greater than the second tubular body 34. Each of the first tubular body 32, the base 33, and the second tubular body 34 may be made up of a suitable material such as a glass, ceramic, porcelain, plastic, stainless steel and so on.

It should be noted that space is created due to the gap between the inner surface of the first tubular body 32, the base 33 and outer surface of second tubular body 34. Further, an opening is created at the upper portion or filling and pouring a beverage. The space created between the inner surface of the first tubular body 32, the base 33 and outer surface of second tubular body 34 forms a first chamber C1. Further, additional space is created inside of the base 33 and the second tubular body 34. Further, an opening is created at the upper portion or filling and pouring a beverage. The space created inside of the base 33 and the second tubular body 34 forms a second chamber C2.

In the present embodiment, the container 30 may be provided with a first pipe 35 and a second pipe 36. The first pipe 35 extends from the inner surface of the first tubular wall 32 and the second pipe 36 extends from the inner surface of the second tubular wall 34. Each of the first pipe 35 and the second pipe 36 are used to dispense the liquid stored in the first chamber C1 and the second chamber C2, respectively.

As specified above, each of the first chamber C1 and the second chamber C2 are used to store two different liquids. For example, the second chamber C2 may be filled with the liquid drawn from a first storage tank S1. The liquid from the first storage tank S1 is made to flow into the second chamber C2 via a third pipe 37. Similarly, the first chamber C1 may be filled with the liquid drawn from a second storage tank S2. The liquid from the second storage tank S2 is made to flow into the first chamber C1 via a fourth pipe 38.

Although the above description is explained to include two tubular walls and a base for storing two separate liquids, it should be understood that more than two tubular walls may be provided for storing three or more different type of liquids in the container and such an implementation should be obvious to a person skilled in the art. Further, diameter of the second tubular wall may be chosen dependent on the type of liquid to be stored in the second chamber. As such, the diameter of the first tubular wall and the second tubular wall as shown in the figures should not be construed in limited sense. In addition, the shape of the first tubular wall and the second tubular wall should not be construed in limited sense, other shapes such as square, tapered or any other shape are within the scope of the present disclosure.

Further, the container may be used in the form of beer glass, wine, cup and so on for consuming one or more liquids. In one example, the second chamber/second tubular wall may be used to hold hot liquid and the first tubular wall may act as an insulated wall to protect user from contacting the second tubular wall.

In use, the user may fill two different types of liquids such as vodka in first chamber and cranberry in second chamber. In one example, the user may allow the vodka to flow into the second chamber from the first chamber in order to mix and have the drink. In another example, the user may fill same liquid in both the chambers and refill the liquid from another chamber when the liquid gets over in one chamber.

Additional examples may include but not limited to containers in the form of stemmed or non-stem wine glass. For instance, dessert wine may be filled in the first chamber and red wine may be filled in the second chamber. When the red wine gets over in the second chamber, the desert wine is made to flow into the second chamber using the mechanisms explained above. Further, it should be understood that the liquid stored in the first chamber and the second chamber may include liquid of same type e.g., red wine in both chambers or may include two different liquids e.g., dessert wine in the first chamber and red wine in the second chamber, Another example may include providing the container for use in fitness industry. For instance, a first health drink may be filled in the first chamber and a second health drink may be filled in the second chamber. When the second health drink gets over in the second chamber, the second health drink is made to flow into the second chamber.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A container for holding liquid, comprising:

A first tubular member having a bottom circumference concentrically mounted to a second tubular member, said first tubular member has a diameter greater than said second tubular member; a base member entirely below said bottom circumference; a first chamber created by a spacing between said base member, said first tubular member and said second tubular member;

said first chamber adapted to hold a predetermined amount of a beverage; a second chamber located within said second tubular member; a first opening on said first tubular member aligned with a second openings on said second tubular member; a push release connector having a proximal and distal end and extending through said first and second openings; a stopper located on the second tubular member's inner side covering said second opening; said push release connected adapted to be pushed towards said second tubular member pushing said stopper inside said second chamber creating a clearance so that liquids in said first chamber can flow into said second chamber.

2. The container of claim 1 wherein said first tubular member, said second tubular member and said base are made of glass, ceramic, porcelain, plastic, or stainless steel.

3. The container of claim 1 wherein said base member is integrally mounted to said first tubular member and second tubular member.

4. The container of claim 1 further including a handle.

5. The container of claim 1 wherein said first tubular member and said second tubular member are square or cylindrical shaped.

6. The container of claim 1 including a first storage tank connected to a first storage pipe that extends into said first chamber.

7. The container of claim 6 including a second storage tank connected to a second storage pipe that extends into said second chamber.

* * * * *